(12) United States Patent
Sakaniwa et al.

(10) Patent No.: US 7,805,157 B2
(45) Date of Patent: Sep. 28, 2010

(54) WIRELESS COMMUNICATION TERMINAL

(75) Inventors: Hidenori Sakaniwa, Kawasaki (JP);
Atsushi Koike, Yokohama (JP);
Mitsuhiro Kitani, Yokohama (JP)

(73) Assignee: Casio Hitachi Mobile Communications Co., Ltd., Tokyo (JP)

( * ) Notice: Subject to any disclaimer, the term of this patent is extended or adjusted under 35 U.S.C. 154(b) by 1099 days.

(21) Appl. No.: 11/441,713

(22) Filed: May 25, 2006

(65) Prior Publication Data

US 2006/0268336 A1 Nov. 30, 2006

(30) Foreign Application Priority Data

May 27, 2005 (JP) ............................. 2005-154922

(51) Int. Cl.
*H04M 1/00* (2006.01)
*H04W 24/00* (2009.01)
(52) U.S. Cl. .................................... 455/550.1; 455/423
(58) Field of Classification Search ................ 455/63.1, 455/67.13, 423, 436–440, 452.2, 566, 574; 370/331–332, 392.2
See application file for complete search history.

(56) References Cited

U.S. PATENT DOCUMENTS

| 6,185,431 B1 * | 2/2001 | Li et al. ....................... 455/522 |
| 6,970,708 B1 * | 11/2005 | Raith .......................... 455/440 |
| 2006/0126577 A1 * | 6/2006 | Yano et al. .................. 370/337 |
| 2006/0187885 A1 * | 8/2006 | Roy et al. .................... 370/332 |
| 2006/0264197 A1 * | 11/2006 | Mahini et al. ............ 455/343.5 |

FOREIGN PATENT DOCUMENTS

JP         2003-051781         2/2003

* cited by examiner

*Primary Examiner*—Michael T Thier
(74) *Attorney, Agent, or Firm*—Cohen Pontani Lieberman & Pavane LLP

(57) ABSTRACT

In a wireless communication terminal, information from a wireless communication unit is decoded by a communication control unit and analysis information is acquired. A content reception judgment unit instructs the communication control unit to terminate a content receiving process if a mobile radio environment corresponding to transmission rate information of the contents, included in the analysis information, is below a content reception threshold stored in a content reception threshold storage unit. Thus, the wireless communication terminal can judge that the possibility of a failed reception is high before content reception, and needless power consumption can be prevented and power consumption reduced by not performing reception.

4 Claims, 6 Drawing Sheets

FIG.2

| CONTENT RECEPTION THRESHOLD STORAGE UNIT | |
|---|---|
| CONTENT TRANSMISSION RATE | RECEIVE SIGNAL INDICATOR THRESHOLD |
| 32kbps | −9.0 |
| 64kbps | −8.0 |
| ⋮ | ⋮ |
| 1Mbps | −7.0 |
| 2Mbps | −6.0 |

FIG.5

| CONTENT RECEPTION THRESHOLD STORAGE UNIT |||||||
|---|---|---|---|---|---|---|
| CONTENT TRANS- MISSION RATE | R/S THRES- HOLD | R PROBA- BILITY | NOT-READY TIME SETTING | CONTENT TRANS- MISSION TIME | | ... |
| 32kbps | -10 | 30% | 2005.3.15 9:00-10:00 | PROGRAM ID1;10:30 | | ... |
| | -9.5 | 60% | | PROGRAM ID2;12:30 | | |
| | -9.0 | 100% | | | | |
| 64kbps | -9.0 | 50% | 2005.3.15 15:00-17:00 | | | ... |
| | ⋮ | ⋮ | | ⋮ | | ⋮ |
| | -8.0 | 100% | | | | |
| 1Mbps | -10 | 5% | 2005.3.20 21:00-22:00 | | | ... |
| | ⋮ | ⋮ | | ⋮ | | ⋮ |
| | -7.0 | 100% | | | | |
| 2Mbps | -10 | 0% | | PROGRAM Idx;2:00 | | ... |
| | -7.0 | 10% | | | | |
| | -6.0 | 100% | | | | | ant text content:

WIRELESS COMMUNICATION TERMINAL

CROSS-REFERENCE TO RELATED APPLICATION

This application is based upon and claims the benefit of priority from the prior Japanese Patent Application No. 2005-154922, filed May 27, 2005, the entire contents of which is incorporated herein by reference.

BACKGROUND OF THE INVENTION

1. Field of the Invention

The present invention relates to a wireless communication terminal that reduces power consumption when a reception environment is degraded.

2. Description of the Related Art

In data transmission, a data transmission rate (rate of physical layer) that matches between a transmitting-end and a receiving-end is selected, and data is transmitted and received. The transmission rate must be set higher because of the larger the size of a packet to be transmitted per unit of time. Terminals near a base station, such as a wireless terminal in a location within visible range of the base station, are in a favorable mobile radio environment and can transmit data with little frame error/packet error, even when a large transmission rate is assigned thereto.

However, terminals located far from a base station and terminals in a location, such as underground, where reception of radio waves is difficult are susceptible to error factors, such as noise, interference, and attenuation. Therefore, when a large transmission rate is assigned to a terminal, the terminal becomes vulnerable to influence during transmission because the amount of data transmitted at one time is large. Thus, many frame errors/packet errors occur and data transmission may fail. As a countermeasure to a situation as such, in Japanese Laid-Open Patent Publication No. 2003-51781, for example, a technology that performs data transmission by measuring a reception environment of a received signal and determining a transmission rate according to a table that sets transmission rates corresponding to reception environments is disclosed.

Generally, in data communication, one data transmission rate is selected from a plurality of transmission rates (communication speeds) supported between the transmitting and receiving stations and subsequent communication is performed at the selected transmission rate. The technology described in Japanese Laid-Open Patent Publication No. 2003-51781 provides a transmission rate table corresponding to reception environments. Through negotiations in both directions, the reception terminal selects a transmission rate suitable for the mobile radio environment or a transmission rate supported by the transmitting-end thereby enabling communication suited for the terminals.

However, the following issue can be considered when the transmission rate of a transmitting-end is determined unilaterally by the transmitting-end in a one-to-many, single-direction communication, such as broadcast and multicast communication. Namely, when a large transmission rate is assigned to a terminal in a poor mobile radio environment (the value expressing mobile radio environment is small and communication cannot be performed successfully), many frame errors/packet errors occur and data transmission may fail. Because the transmission rate cannot be controlled by the reception terminal, even if the reception terminal changes the transmission rate according to the reception environment, the transmission rate does not match between the transmitting and receiving stations. Thus, communication cannot be performed.

Data communication cannot be established in the situation above even when the transmission rate is changed at the receiving-end and data reception is attempted and thus, this operation becomes a factor in needless power consumption in the terminals. In addition, when data transmission accommodating the transmission rate of the transmitting-end is attempted, if the mobile radio environment is below a certain received signal strength indicator, many frame errors/packet errors occur in a communication at a transmission rate that is not suitable for the mobile radio state and as a result, data communication fails.

SUMMARY OF THE INVENTION

In accordance with an aspect of the present invention, there is provided a wireless communication terminal comprising: a wireless communication means for performing wireless communication; a communication control means for receiving mobile radio environment information and content information from the wireless communication unit and controlling a content receiving process according to analysis information acquired by decoding the information from the wireless communication means; a content reception threshold storage means for tabulating, correlating and storing content transmission rate information accommodated to the reception characteristics of the wireless communication means and mobile radio environment information; and a content reception judgment means for receiving the mobile radio environment information and the content transmission rate information from the communication control unit, collating the mobile radio environment information and the content transmission rate information with the transmission information in the content reception threshold storage means, and judging whether the content receiving process is performed; wherein the content reception threshold storage means instructs the communication control means to terminate the content receiving process if the mobile radio environment corresponding to the transmission rate information of the contents, included in the analysis information, is below a value set by the content reception threshold.

In accordance with another aspect of the present invention, there is provided a wireless communication terminal comprising: a wireless communication means for performing wireless communication; a communication control means for receiving mobile radio environment information and content information from the wireless communication unit and controlling a content receiving process according to analysis information acquired by decoding the information from the wireless communication means; a user interface means to which a user inputs information; an application means for using information from the communication control means, the content reception threshold storage means, and the user interface means; a display means for displaying a result of processing by the application means and information in the communication control means; a content reception threshold storage means for storing information of content transmission rate information accommodated to the reception characteristics of the wireless communication means and mobile radio environment information that was tabulated and correlated, and information input from said user interface means; and a content reception judgment means for receiving the mobile radio environment information and the content information from the communication control unit, collating the mobile radio environment information and the content information with the transmission information in the content reception threshold storage means, and judging whether the content receiving process is performed; wherein the content reception is controlled by the application means or the content reception judgment means.

The above and further novel features of the present invention will more fully appear from the following detailed description when the same is read in conjunction with the accompanying drawings. It is to be expressly understood, however, that the drawings are for the purpose of illustration only and are not intended as a definition of the limits of the invention.

BRIEF DESCRIPTION OF THE DRAWINGS

FIG. 2 is a diagram of an example of an information table stored in a content reception threshold storage unit 106;
FIG. 5 is a diagram of an example of an information table stored in a content reception threshold storage unit 406.

DETAILED DESCRIPTION OF THE PREFERRED EMBODIMENTS

The present invention will hereinafter be described in detail with reference to the preferred embodiments shown in the accompanying drawings.

A. First Embodiment

A-1. Configuration

Figure 1:
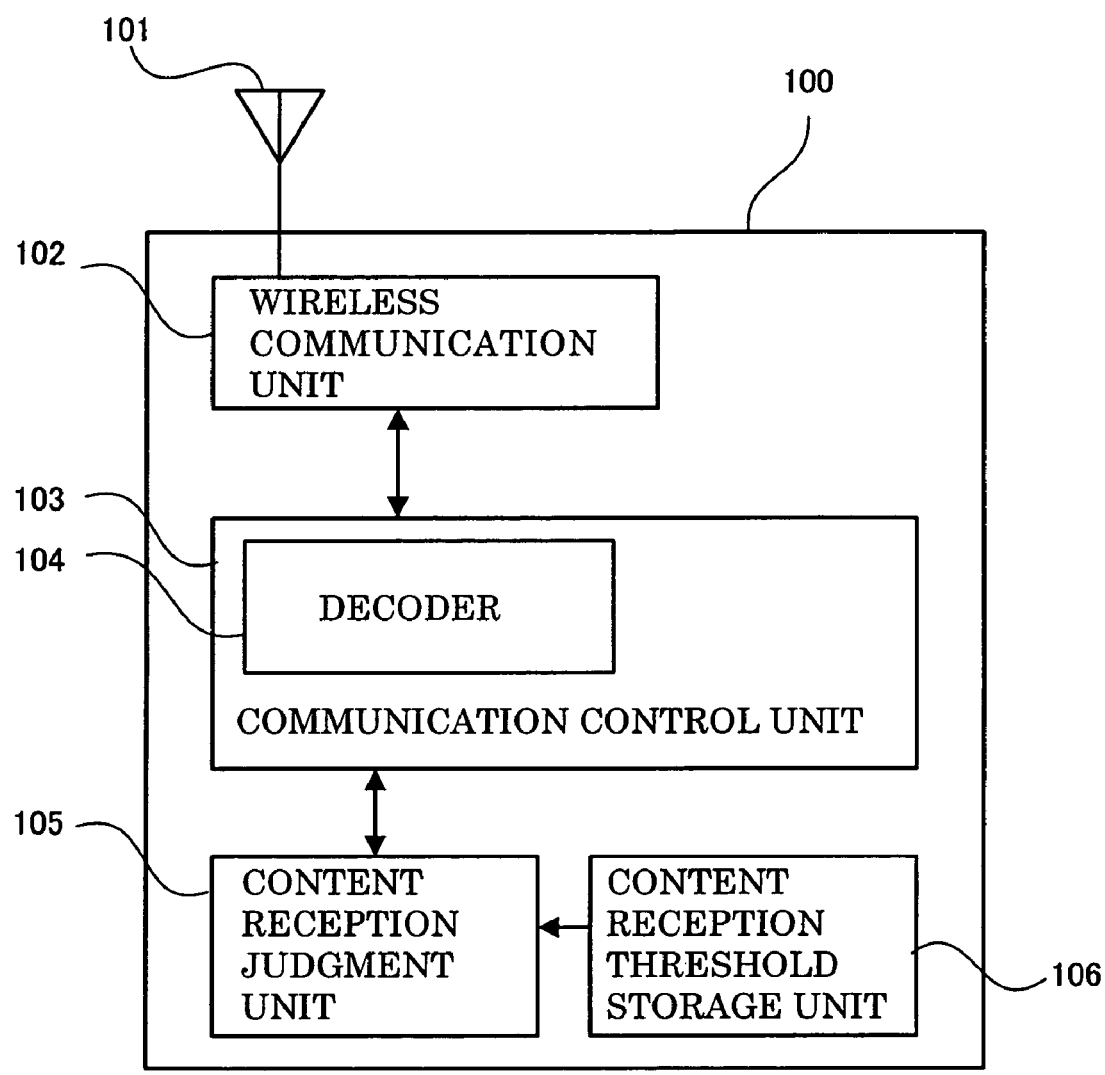
FIG. 1 is a block diagram of a configuration of the first embodiment of the present invention.
Figure 3:
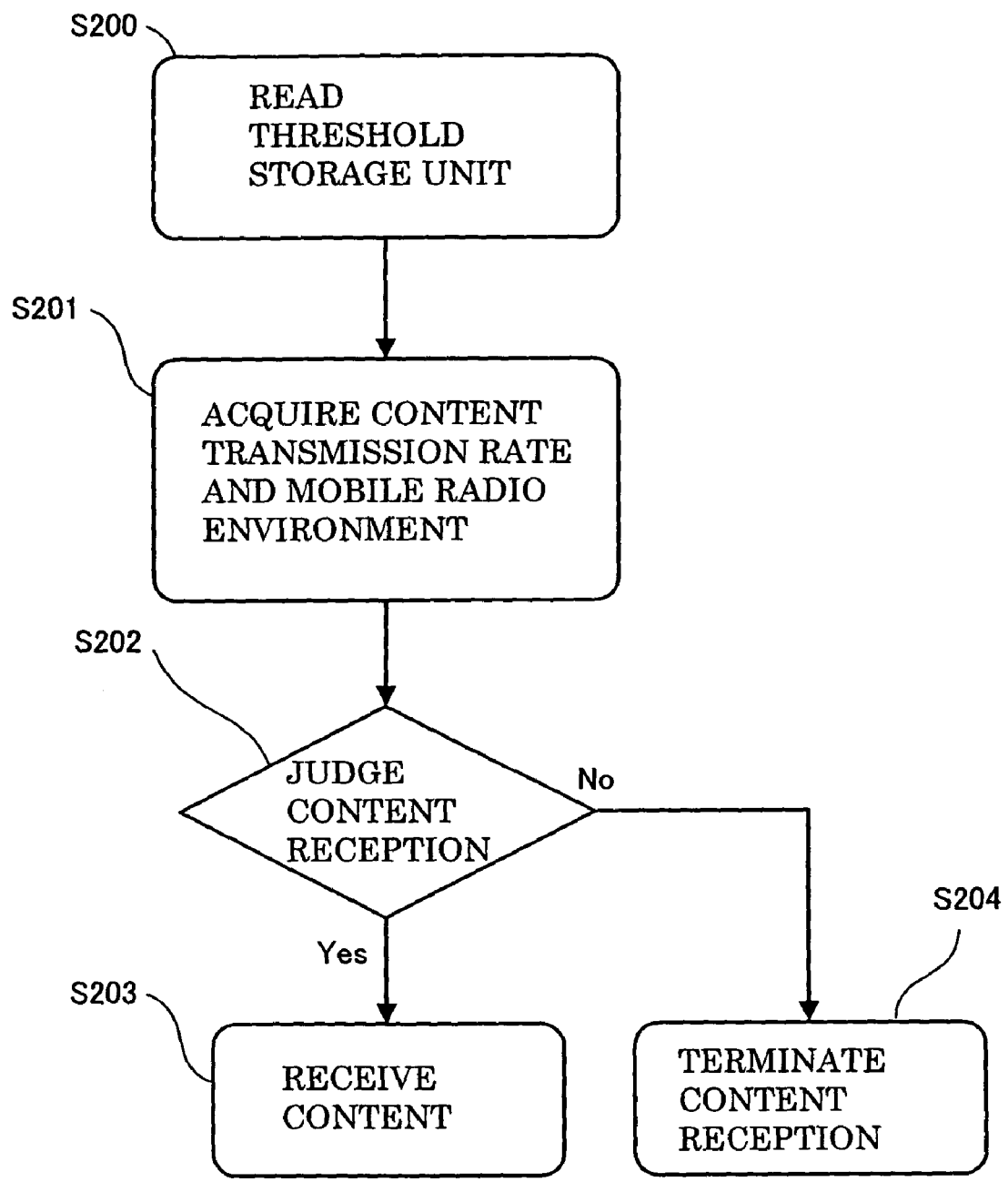
FIG. 3 is a flowchart of an operation of a content reception judging process.

FIG. 1 is a block diagram of a configuration of a communication terminal 100 (the wireless communication terminal of the present invention) according to the first embodiment of the present invention. In this diagram, reference number 101 is an antenna and reference number 102 is a wireless communication unit that outputs a reception signal received by the antenna 101 to a communication control unit 103, and at the same time, wirelessly transmits a transmission signal supplied by the communication control unit 103 via the antenna 101. The wireless communication unit 102 has a function that measures the mobile radio environment of the antenna 101 and supplies the measurement result (mobile radio environment) to the communication control unit 103.

The communication control unit 103 includes a decoder 104 that decodes information sent from the wireless communication unit 102 and analyzes information sent from a transmitting-end. The communication control unit 103 analyzes the information decoded by the decoder 104 and controls communication according to the information. For example, if content transmission rate information is included in the information decoded by the decoder 104, the communication control unit 103 selects a communication system corresponding to the transmission rate and performs a content receiving process.

The communication control unit 103 can control communication using a mobile radio environment received from the wireless communication unit 102. For example, if a base station with a larger mobile radio environment value than the base station with which the terminal is currently in communication is found while moving, the communication control unit 103 controls the wireless communication unit 102, performs a handoff process for switching communication parties, and performs control to actualize seamless communication, etc. Furthermore, in the communication control unit 103, communication control is also performed based on a judgment result from a content reception judgment unit 105 explained hereafter. When judged in the content reception judgment unit 105 that content reception is performed, a content receiving process according to the content transmission rate decoded by the decoder 104 is performed. When judged in the content reception judgment unit 105 that content reception is not performed, transition to the content receiving process is terminated and needless power consumption is suppressed.

The content reception judgment unit 105 acquires the mobile radio environment information of the wireless communication unit 102 received from the communication control unit 103, the content transmission rate information decoded in the decoder 104, and the receive signal indicator threshold corresponding to the content transmission rate from a content reception threshold storage unit 106 explained hereafter, and judges whether content reception is performed in the current mobile radio environment according to the information. Details of the content reception judging process performed by the content reception judgment unit 105 are explained hereafter.

The content reception threshold storage unit 106 has an information table to which receive signal indicator thresholds corresponding to the content transmission rates are stored. FIG. 2 is a diagram of an example of the information table. As shown in FIG. 2, the information table can be created to accommodate the reception characteristics of each terminal. Although values determined through individual adjustments for each terminal are preferably used, the values can be representative values acquired by simulations and experiments.

A-2. Operations

Next, an operation of the content reception judging process performed by the content reception judgment unit 105 of the communication terminal 100 according to the configuration above is explained. In Step S200, the content reception judgment unit 105 first reads the threshold of the mobile radio environment configured for each content transmission rate from the content reception threshold storage unit 106. The configured mobile radio environment is a mobile radio environment required to receive contents transmitted at a certain transmission rate.

The use of a number of methods can be considered for the mobile radio environment information. For example, a received signal strength indicator (RSSI), an Ec/Io that indicates energy intensity, and a carrier-to-interference (C/I) that is the carrier-to-interference energy ratio of a pilot signal can be used. When contents transmitted at 1 Mbps is received by broadcast or multicast communication using the mobile radio environment information, a received signal indicator threshold N is correlated to 1 Mbps to indicate that the reception terminal requires a mobile radio environment of NdBm (or dB) (N is an integer). The data uses values determined by experiments, etc.

Next, in Step S201, the content transmission rate information included in a message analyzed by the decoder 104 within the communication control unit 103 and the mobile radio environment information of the wireless communication unit 102 monitored by the communication control unit 103 are acquired. Then, in Step S202, it is judged whether content reception is performed or not. In the case of this judgment, received signal indicator threshold corresponding to the content transmission rate acquired at Step S201 is determined from the information table read at Step S200 and the difference between the current mobile radio environment acquired at Step S201 and the threshold is judged.

If the current mobile radio environment acquired at Step S201 is equal to or more than the received signal indicator threshold at Step S200 corresponding to the content transmission rate acquired at Step S201, content reception is performed at Step S203. On the contrary, if the current mobile radio environment acquired at Step S201 is less than the received signal indicator threshold at Step S200 corresponding to the content transmission rate acquired at Step S201, content reception is not performed at Step S203. The judgment in Step S202 can be a judgment method where the content transmission rate corresponding to the mobile radio environment acquired at Step S201 is determined from the information table read at Step S200. The content reception at Step S203 is performed if the content transmission rate acquired at Step S201 is lower than the determined content transmission rate, and the content reception at Step S203 is not performed if the content transmission rate acquired at Step S201 is higher than the determined content transmission rate. This judgment is in accordance to a phenomenon where, generally, if the mobile radio environments are the same, there is less reception failure when the content transmission rate is low.

When the content reception is performed using broadcast or multicast communication in this way, an indication of whether the reception will succeed or fail can be checked before transitioning to the content receiving process. If there is a high probability of failure, content reception is not performed from the start, thereby suppressing power consumption. In other words, when contents are transmitted under a condition where the mobile radio environment is lower than the threshold, consumption of power in the terminals due to the performance of content reception until communication failure, in spite of the high probability of communication failure, can be suppressed.

B. Second Embodiment

Figure 4:
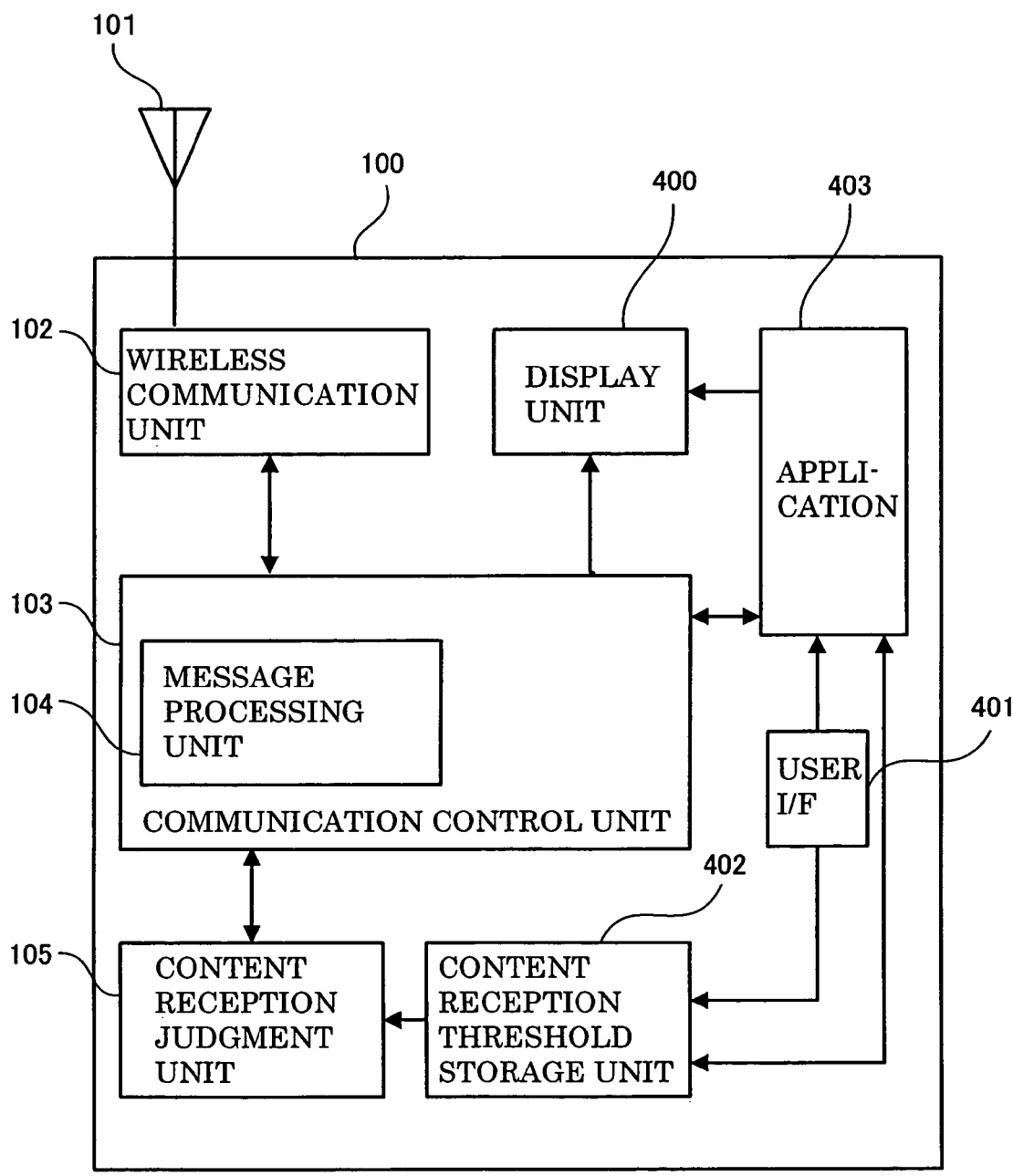
FIG. 4 is a diagram of a configuration of the second embodiment of the present invention.

FIG. 4 is a block diagram of a configuration of the communication terminal 100 according to a second embodiment of the present invention. In this diagram, constituent elements shared with the first embodiment are given the same reference numbers and explanations thereof are omitted. In FIG. 4, a content reception threshold storage unit 402, explained hereafter, is an expansion of the content reception threshold storage unit 106 of the first embodiment and has a function to which additional information is further added.

A display unit 400 displays the communication status of the communication control unit 103, such as "in communication", "out-of-range", antenna picture display and received content information and has a function for transmitting information to a user. Reference number 401 is a user interface and has a function for receiving input from the user. In the first embodiment, it is judged that whether content reception is performed automatically within a terminal. However, in the second embodiment, the user can set whether or not to perform content reception as desired through the provision of the display unit 400 and the user interface 401. In addition, because the display unit 400 is installed, the judgment result when automatic judgment is made as in the first embodiment can be notified to the user.

Content delivery time information, reception success probability information of the mobile radio environment corresponding to the content transmission rate, and data inputted by the user can be stored in the content reception threshold storage unit 402. An example of an information table stored in the content reception threshold storage unit 402 is explained with reference to FIG. 5. The information table shown in the diagram stores mobile radio environments corresponding to each content transmission rate and the content reception success probability information corresponding thereto.

In addition, information can be set in the content reception threshold storage unit 402 directly from the user interface 401, and user receive-not-ready time information set by the user and content transmission time information sent from the transmitting-end are also stored in the information table of the content reception threshold storage unit 402. Data can be stored as data corresponding to an application 403, and the application 403 can improve content reception success probability and enhance user-friendliness through the use of the information.

The application 403 is a group of programs run on a terminal to which data can be directly input and output from the user interface 401 and the content reception threshold storage unit 402. The application 403 operates the display unit 400 and has a function for providing various services to the user. For example, during content reception, "X % probability of reception failure in the communication state in this location. Perform reception?", "Content reception scheduled for Y o'clock. Please move to a location with better mobile radio environment," etc. can be displayed in the display unit 400 which has an effect where the user can reduce the probability of reception failure of desired contents. In addition, for example, if the user inputs a time period when an environment where a poor mobile radio state (communication cannot be performed satisfactorily) is expected (when riding on a subway or when in a meeting in the upper floors of a high-rise building) in the content reception threshold storage unit 402, a process for not performing content reception can be performed in advance for content reception during this time period, thereby reducing power consumption.

Figure 6A:
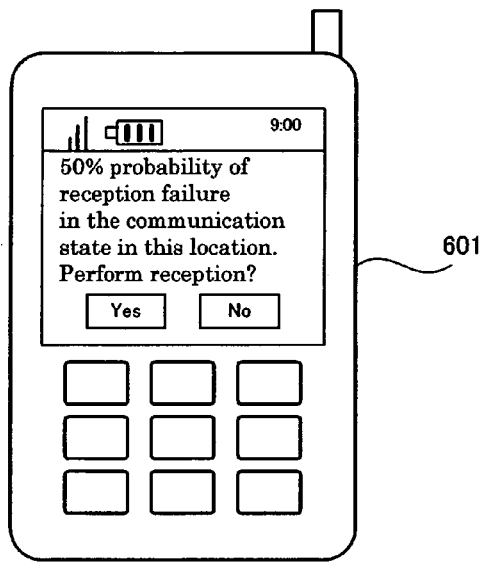
FIG. 6A through FIG. 6D are diagrams of an example of an execution of an application 403.
Figure 6B:
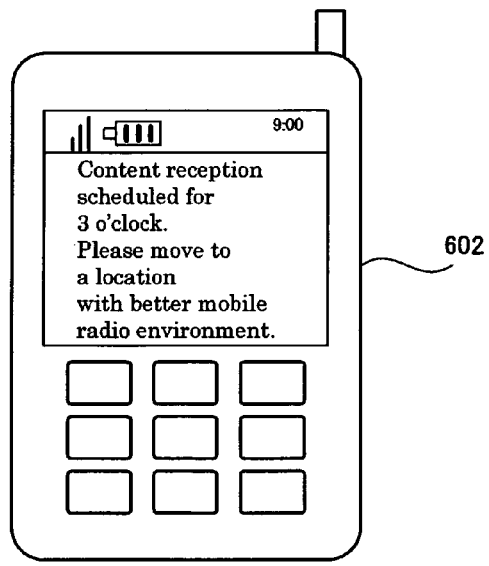

Next, an example of an execution of the application 403 is explained with reference to FIG. 6A through FIG. 6D. In FIG. 6A, reference number 601 is an example where reception success of a content reception in the current mobile radio environment, according to the information table in the content reception threshold storage unit 402, is displayed and the risk of whether to attempt reception in spite of battery consumption is left up to the user. This is effective for usage accommodating user preference. In FIG. 6B, reference number 602 is an example where the possibility that reception failure will occur at the current location when contents broadcast at a future time is received is judged, according to the information table in the content reception threshold storage unit 402, by the content reception judgment unit 105 or the application 403 and from this result, a notification is made in the display unit 400 to the user to move the terminal to a location where the mobile radio state is favorable (a location where the value expressing mobile radio environment is large and communication can be performed successfully).

In this way, the user can move the terminal to a location with a favorable mobile radio environment known from a past experience and the desired content reception can be performed. In this case, the user can be guided to a nearby location with a favorable mobile radio environment by an application in conjunction with a field-strength map.

Figure 6C:
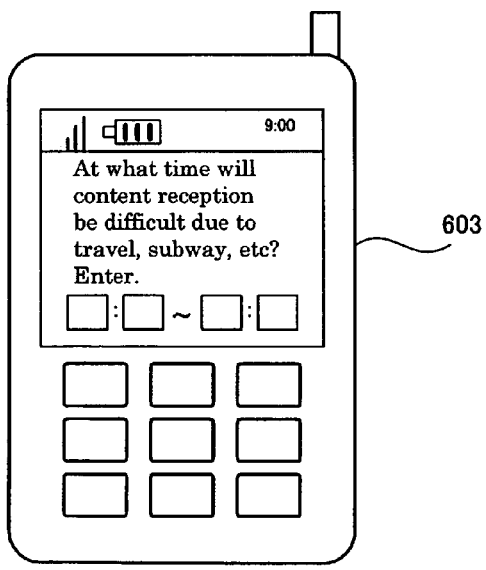
Figure 6D:
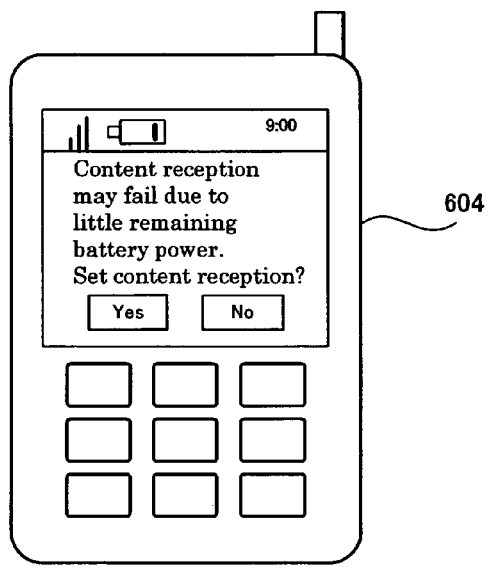

In FIG. 6C, reference number 603 is an example where power consumption can be further reduced if it is known in advance that the mobile radio environment is poor (the value expressing mobile radio environment is small and communication cannot be performed successfully) by the user setting this time period so that content receiving processes and content reception judging processes are not performed during this time. In FIG. 6D, reference number 604 is an example where, when there is little remaining battery power, notification is made to the user of the possibility that the battery will run out during content reception and content reception will fail, in conjunction with the remaining battery power of the terminal. In this case, the monitoring of the remaining battery level is given priority regardless of the structure of content reception according to the present invention and it is determined that content reception is performed or not. This is also a means that allows the user to determine how to use the remaining battery power and this embodiment of the present invention has an effect on the improvement of convenience to the user. Furthermore, a method where content reception is not performed, regardless of the structure of content reception according to the present invention, when the remaining battery power is less than the set threshold can be considered.

As explained above, according to the present invention, if a terminal becomes aware of the possibility that content reception will fail before content reception and the mobile radio state is lower than a certain value due to degradation of the reception environment, needless power consumption that occurs in the reception operation of the terminal, from the start of content reception to reception failure, can be suppressed by not performing content reception.

Each embodiment of the present invention explained above is an example to explain the present invention and the purpose thereof is not to limit the scope of the present invention to only these embodiments. Persons skilled in the art will recognize that various other embodiments of the present invention can be carried out without departing from the spirit of the present invention.

While the present invention has been described with reference to the preferred embodiments, it is intended that the invention be not limited by any of the details of the description therein but includes all the embodiments which fall within the scope of the appended claims.

What is claimed is:

1. A wireless communication terminal comprising:
   a wireless communication means for performing wireless communication;
   a communication control means for receiving mobile radio environment information and content information of broadcasted or multicasted information from the wireless communication means and controlling a content receiving process according to analysis information acquired by decoding the information from the wireless communication means;
   a user interface means to which a user inputs information;
   a content reception threshold storage means for storing information tabulating and correlating content transmission rate information and mobile radio environment information accommodated to the reception characteristics of the wireless communication means, and information input from said user interface means;
   an application means for using information from the communication control means, the content reception threshold storage means, and the user interface means;
   a display means for displaying a result of processing by the application means and information in the communication control means; and
   a content reception judgment means for receiving the mobile radio environment information and the content information from the communication control means, collating the mobile radio environment information and the content information with the transmission information in the content reception threshold storage means, and judging whether or not the content receiving process should be performed;
   wherein the content reception is controlled by the application means or the content reception judgment means;
   wherein the content reception threshold storage means stores content transmission rate information, and mobile radio environment information accommodated to the reception characteristics of the wireless communication means, and reception success probability information corresponding to the mobile radio environment information; and
   wherein the content transmission rate information and mobile radio environment information acquired from the communication control means and the content reception threshold storage means are collated, reception success probability matching the transmission rate of the contents to be received and the current mobile radio environment is retrieved, and a notification of the reception success probability is made from the display means to the user via the application means.

2. The wireless communication terminal according to claim 1, comprising an application means for displaying the reception success probability by the display means and asking the content receiver whether to accept content reception under the reception success probability.

3. A wireless communication terminal comprising:
   a wireless communication means for performing wireless communication;
   a communication control means for receiving mobile radio environment information and content information of broadcasted or multicasted information from the wireless communication means and controlling a content receiving process according to analysis information acquired by decoding the information from the wireless communication means;
   a user interface means to which a user inputs information;
   a content reception threshold storage means for storing information tabulating and correlating content transmission rate information and mobile radio environment information accommodated to the reception characteristics of the wireless communication means, and information input from said user interface means;
   an application means for using information from the communication control means, the content reception threshold storage means, and the user interface means;
   a display means for displaying a result of processing by the application means and information in the communication control means;
   a content reception judgment means for receiving the mobile radio environment information and the content information from the communication control means, collating the mobile radio environment information and the content information with the transmission information in the content reception threshold storage means, and judging whether or not the content receiving process should be performed; and
   a storage means to which a time when content reception cannot be performed is input by the user interface means, and storing the time information in the content reception threshold storage means, wherein content reception is not performed in the application means during the stored time,
   wherein the content reception is controlled by the application means or the content reception judgment means.

4. A wireless communication terminal comprising:

a wireless communication means for performing wireless communication;

a communication control means for receiving mobile radio environment information and content information of broadcasted or multicasted information from the wireless communication means and controlling a content receiving process according to analysis information acquired by decoding the information from the wireless communication means;

a user interface means to which a user inputs information;

a content reception threshold storage means for storing information tabulating and correlating content transmission rate information and mobile radio environment information accommodated to the reception characteristics of the wireless communication means, and information input from said user interface means;

an application means for using information from the communication control means, the content reception threshold storage means, and the user interface means;

a display means for displaying a result of processing by the application means and information in the communication control means;

a content reception judgment means for receiving the mobile radio environment information and the content information from the communication control means, collating the mobile radio environment information and the content information with the transmission information in the content reception threshold storage means, and judging whether or not the content receiving process should be performed;

wherein the content reception is controlled by the application means or the content reception judgment means; and wherein when content transmission time information is stored in the content reception threshold storage means, the mobile radio environment information and the content information is received from the communication control means, the radio environment information and the content information is collated with transmission information of the content reception threshold storage means, and the mobile radio environment information does not reach the content reception threshold, a notification is made to the user to move to a location with a favorable mobile radio environment at the content transmission time.

* * * * *